: 3,579,349
PREPARATION OF CHOCOLATE EXTRACT
Abraham R. Mishkin, Richard D. Martin, and Joseph L. Ohler, Marysville, Ohio, assignors to Societe d'Assistance Technique pour Produits Nestle S.A., Lausanne, Switzerland
No Drawing. Filed Aug. 19, 1968, Ser. No. 753,779
Int. Cl. A23g 1/00
U.S. Cl. 99—23                    7 Claims

ABSTRACT OF THE DISCLOSURE

A chocolate extract is prepared by steam-stripping a mixture of water and cocoa liquor to remove and recover aromatic constituents, heating the stripped mixture, separating the aqueous phase containing the water-soluble constituents and adding the recovered aromatics.

---

This invention is concerned with a process for extracting a water-soluble chocolate flavouring from cocoa liquor.

The flavouring produced by this process, being completely water-soluble, is especially useful for flavouring milk, carbonated beverages and the like, although it may be especially used for flavouring cakes, icing sugar or for any culinary application requiring a chocolate colour and flavour.

Chocolate colours and chocolate flavours as conventionally prepared are essentially water-immiscible as they contain considerable amounts of hydrophobic material even when the major part of the cocoa butter in the chocolate has been removed as by pressing or extraction with a solvent. Miscibility with water may, for example, be improved by "dutching," i.e. heating with an alkali such as potassium carbonate, but the product obtained is still far from being perfectly water-soluble. Thus, on dispersal in water or a system containing a large amount of water, a suspension of cocoa powder is obtained giving a dark, opaque appearance and a characteristic heavy taste. This is satisfatcory for "night-cap" drinks, especially when milk is used as the aqueous medium but it is less suitable for soft drinks and carbonated beverages which require a much lighter texture and a transparent sparkling appearance in the bottle.

It is possible to prepare chocolate flavouring compositions which are solutions rather than emulsions in organic solvents but here again a heterogeneous system is obtained when the solution is added to water. Moreover, the use of non-toxic organic solvents in food for sale is expensive and frequently subject to legal restrictions.

It has now been found that a completely water-soluble chocolate extract containing substantially all of the flavouring constituents found in roasted cocoa beans can be obtained from cocoa liquor by a relatively simple process employing aqueous extraction.

According to the invention, a process for preparing a water-soluble chocolate extract comprises the steps of steam-stripping aromatic constituents from a mixture of cocoa liquor containing cocoa butter and water, condensing said aromatic constituents, heating the stripped mixture of extract water-soluble constituents from the cocoa liquor, separating the heated mixture into a first residual sludge and a first aqueous phase containing said water-soluble constituents and combining the condensed aromatic constituents with the separated water-soluble constituents.

By "cocoa liquor" is meant the liquor produced by grinding roasted and shelled cocoa beans. It consists of approximately equal proportions of fat (cocoa butter) and non-fat cocoa solids. At the temperatures of the process the fat is in liquid state since its melting point is approximately 33° C. For convenience, liquid cocoa butter is herein referred to as oil.

The raw material for the process comprises chocolate liquor which is prepared in conventional manner by roasting and crushing of cocoa beans. This produces a brown, viscous sludge containing all the constituents of the roast cocoa beans including cocoa butter, the carbohydrates found in cocoa and the various volatile and non-volatile constitutents characteristic of the odour and flavour of chocolate.

Much of the odour and flavour of chocolate is due to constituents which are at least partially volatile in steam. Thus, when an aqueous extract is prepared from raw cocoa liquor, and subsequently concentrated by evaporation, a high proportion of these steam-volatile compounds, known as "aromatics," is removed from the solution. This loss takes place even when the evaporation is performed under reduced pressure and hence at a lower temperature. Losses may also occur during the extraction step itself. A decidedly inferior flavour in the final product is produced if steps are not taken to retain these aromatics.

To avoid the loss of aromatics, they may be retained by steam stripping a slurry of raw cocoa liquor before it is fed to the extractors. The liquor slurry is treated with steam and the aqueous vapour containing the aromatics so produced is condensed. Preferably the bulk of the distillate, consisting almost entirely of water, is condensed and discarded before the lower-boiling fraction containing the aromatics is separately condensed and isolated for subsequent addition to the aqueous condensate. The stripped liquor slurry containing a large amount of water, is pumped to the first extractor for processing, as described below.

The stripping is preferably performed on a slurry containing water and the cocoa liquor obtained by grinding the roast cocoa beans. A typical mixture contains 92% by weight water and 8% cocoa liquor (45% cocoa, 55% cocoa butter). The mixture is prepared in a mixing tank provided with a stirrer and is pumped into a stripping column with a steam inlet and discharge port for the slurry at the bottom and an outlet for the vapours at the top leading to a condensing system.

The aroma-laden vapours are condensed and may optionally be rectified, preferably in a countercurrent fractionation column where they are contacted with a current of steam. The residue, drawn from the bottom of the column and consisting almost entirely of water, is discarded whereas the lower-boiling fraction, recovered at the top end and comprising about 10% of the total distillate, is added to the concentrated aqueous extract at a stage following any major evaporation of the extract. Most of the volatiles are thus returned to the extract.

The cocoa liquor discharged from the stripping column is mixed, preferably in a conventional mixer, to give a uniform slurry and fed into an extraction unit, advantageously a batterty of extractor tubes which are surrounded by heating jackets to control the temperature in the tubes. A typical feed may contain 5.0% cocoa liquor and 4.1% oil when fed into the extractors. Steam under pressure is passed into the tubes with the liquor to raise the temperature and after the required extraction time the mixture of liquor and water containing the water-soluble chocolate constituents is discharged from the extractor as a slurry through a suitable valve. Preferred conditions for the extraction are 25–35 minutes at a temperature in the range 107–132° C. The mixture is preferably passed through a mixing device and then to a primary centrifuge, advantageously a desludging centrifuge of conventional construction.

The slurry is separated by the centrifuge into two primary fractions, one consisting mainly of cocoa sludge, the other of aqueous effluent. Typically the primary effluent fraction contains about 5.2% oil and 2.2% cocoa and the primary sludge fraction contains about 3.9% oil and 14.0% cocoa.

The primary effluent fraction is then passed into an oil separation centrifuge of known type, where it is separated into three fractions. One fraction consists mainly of residual sludge from the effluent fraction and this typically contains around 23.0% cocoa and 8.8% oil. The second fraction comprises oil with a small amount of water as an emulsion in the oil and the third fraction comprises a sludge-free aqueous solution containing the water-soluble substances from the original cocoa and a slight amount of oil.

The primary sludge fraction from the desludger and separator still contains a considerable amount of water-soluble cocoa flavouring material and this sludge is advantageously extracted again to recover material. The primary sludge fraction is mixed with more water, preferably in a mixing tank with a stirrer, to give a slurry typically composed of 2.1% oil, 7.3% cocoa and the remainer water. This slurry is pumped into a secondary extractor of similar design to the primary extractor and is treated with steam in the same way. After extraction the mixture is passed through a secondary desludging centrifuge to separate the secondary effluent fraction from the secondary sludge fraction which is discarded. The effluent fraction is passed through a secondary oil separation centrifuge to give a residual sludge which is discarded, a clean oil fraction which is combined with the oil from the primary oil separation centrifuge and an aqueous product which is combined with the primary aqueous product.

The primary and secondary oil separation centrifuges are desirably operated in such a manner as to yield an aqueous product containing substantially no oil. This may be achieved by allowing a high back pressure to build up at the water outlet; the oil/water interface is then displaced towards the oil outlet and the oil content of the aqueous extract is thus substantially reduced. One effect of this is to yield an oil fraction which still contains a small amount of water, generally as emulsified droplets in the oil. To remove the final traces of water the oil may be passed through another oil separation centrifuge.

The aqueous solution produced from the primary and secondary oil separators may be used directly as a flavouring agent, but may, if desired, be concentrated by evaporation to yield a concentrated flavouring essence. Evaporation may be performed in an evaporator of conventional type and is advantageously effected under reduced pressure.

If a syrup is required as the final product, the extract may be evaporated to about 25% solids content. The solids content should desirably not exceed 30% since a gel tends to form which is too viscous to pump. It is also possible to obtain a dry powder by drying the syrup, for example by spray- or freeze-drying. A very satisfactory flavouring and colouring agent is obtained which shows little deterioration on storage.

In order that the invention may more easily be understood, three preferred embodiments thereof are described in the following examples, which are given by way of illustration only. The percentages are by weight.

EXAMPLE I

Finely ground cocoa liquor containing 55% oil (cocoa butter) is continuously fed to an agitated tank at a rate of 13.6 kg. per hour where it is slurried with water added at a rate of 167 kg. per hour. The resulting slurry is pumped into the top of a 203 mm. sieve tray stripping column containing 6 trays. Steam to the reboiler is regulated to produce 273 kg. per hour of distillate which is in turn stripped in a 152 mm. column containing 18 trays producing 2.73 kg. per hour of final distillate. The slurry from the stripping column is then pumped to the extraction tubes where live steam is injected to raise the slurry temperature to 113° C. The calculated hold-up time in the extraction tubes is approximately 25 minutes. The slurry is then allowed to flash through a back-pressure valve into a cyclone separator and then passed into a horizontal desludging centrifuge where the bulk of the nonsoluble sludge is removed. The effluent is then pumped to the first oil separator at 93.5° C., which separates it into three streams. The product stream is produced at 116.8 kg. per hour and contains 0.16 kg. of oil and 2.18 kg. of soluble cocoa. The oil emulsion stream is further separated in another oil separator. The sludge stream is combined with sludge from the desludger and then reslurried with water to give slurry feed to the second stage of 64.7 kg. per hour which contains 1.8% oil and 6.23% cocoa. The second stage slurry is pumped through the second stage extraction tubes where the temperature is again increased to 113° C. and held for a period of about 25 minutes. Again the slurry flashes into a cyclone and passes into the desludger. The effluent from the desludger is produced at 46.6 kg. per hour and contains 1.32% oil and 3.22% cocoa. The 17 kg. per hour of sludge containing 3.2% oil and 14.5% insoluble cocoa is discarded. The effluent is separated by means of an oil separator into three streams. Sludge at 3.27 kg. per hour containing 4.2% oil and 16.7% insoluble cocoa is discarded. The oil emulsion stream is combined with oil emulsion from the first stage separator and separated into a water stream and 6.59 kg. per hour of clean oil. The product effluent from the second stage separator consists of 42.9 kg. per hour of solution containing 0.16% oil and 2.2% cocoa which is mixed continuously with the first stage product effluent. The mixture is concentrated to 25% solids in a vacuum pan and 2.73 kg. per hour of volatile distillate is added. The liquor is then spray-dried to yield a powdered soluble chocolate flavoured icing mix base at an average production rate of 3.36 kg. per hour.

EXAMPLE II

Finely ground chocolate liquor containing 55% oil (cocoa butter) is continuously added to an agitated tank at a rate of 13.1 kg. per hour where it is slurried with water which is added at a rate of 167 kg. per hour. The resulting slurry is pumped into the top of a 203 mm. sieve tray stripping column containing 6 trays. Steam to the reboiler is regulated to produce 27.3 kg. per hour of distillate which is in turn stripped in a 152 mm. column containing 18 trays producing 2.73 kg. per hour of final distillate. The slurry from the stripping column is then pumped to the extraction tubes where live steam is injected to boost the slurry temperature to 113° C. The calculated hold-up time in the extraction tubes is approximately 25 minutes. The slurry is then allowed to flash through a back-pressure valve into a cyclone separator and then passed into a horizontal desludging centrifuge where the bulk of the non-soluble sludge is removed. The effluent is then pumped to the first oil separator at 93.5° C., which separates it into three streams. The product stream is produced at 116.8 kg. per hour and contains 0.16 kg. of oil and 2.16 kg. of soluble cocoa. The oil emulsion stream is further separated in another oil separator. The liquid is concentrated to 25% solids content in a vacuum pan and 2.73 kg. per hour volatile distillate is added. The syrup is then formulated into a non-carbonated soft drink at 68 liters per hour and bottled for room temperature storage.

EXAMPLE III

Finely ground chocolate liquor containing 55% oil (cocoa butter) is continuously added to an agitated tank at a rate of 13.6 kg. per hour where it is slurried with water which is added at a rate of 167 kg. per hour. The slurry is pumped to the extraction tubes where live steam is injected to raise the temperature of the slurry to 113° C. The calculated holdup time in the extraction tubes is approximately 25 minutes. The slurry is then allowed to flash through a back-pressure valve into a cyclone separator and then passed into a horizontal desludging centrifuge where the bulk of the non-soluble sludge is removed. The resulting effluent is pumped into the top of a 203 mm. sieve tray stripping column containing 6 trays. Steam to the reboiler is regulated to produce 27.3 kg. per hour of distillate which is in turn stripped in a 155 mm. column containing 18 trays producing 2.73 kg. per hour of final distillate. The effluent is then pumped to the first oil separator at 93.5° C. which separates it into three streams. The product stream is produced at 116.8 kg. per hour and contains 0.16 kg. oil and 2.18 kg. of soluble cocoa. The oil emulsion stream is further separated in another oil separator. The sludge stream is combined with sludge from the desludger and then reslurried with water to give liquor feed to the second stage of 63.5 kg. per hour which contains 1.8% oil and 6.23% cocoa. The second stage slurry is pumped through the second stage extraction tubes where the temperature is again increased to 113° C. and held for a period of about 25 minutes. Again the slurry is flashed into a cyclone and passed into the desludger. The effluent from the desludger is produced at 46.6 kg. per hour and contains 1.32% oil and 3.22% cocoa. The 17 kg. per hour of sludge containing 3.2% oil and 14.5% insoluble cocoa is discarded. The effluent is separated by means of an oil separator into three streams. Sludge at 3.3 kg. per hour containing 4.2% oil and 16.7% insoluble cocoa is discarded. The oil emulsion stream is combined with oil emulsion from the first stage separator and separated into a water stream and 6.6 kg. per hour of clean oil. The product effluent from the second stage consists of 43 kg. per hour of solution containing 0.16% oil and 2.2% cocoa which is mixed continuously with the first stage product effluent. The mixture is concentrated to 25% solids in a vacuum pan and 2.73 kg. per hour of volatile distillate is added. Carbonated $H_2O$ is introduced into the syrup and a "cola" type soft drink is bottled for room temperature storage.

We claim:

1. A process for preparing a water-soluble chocolate extract, which comprises the steps of steam-stripping aromatic constituents from a mixture of about 8 parts by weight of the cocoa liquor of ground roasted cocoa beans and about 92 parts by weight of water, condensing said aromatic constituents, heating said stripped mixture to a temperature of 107 to 132° C. for about 25 to 35 minutes to extract water-soluble constituents from the cocoa liquor, separating the heated mixture into a first residual sludge and a first aqueous phase containing said water-soluble constituents and combining the condensed aromatic constituents with the separated water-soluble constituents.

2. A process according to claim 1, in which said first residual sludge is mixed with water to form a second aqueous slurry which is heated and separated into a second aqueous phase and a second residual sludge.

3. A process according to claim 2, in which the first and second aqueous phases are each separated into an aqueous extract, cocoa butter and a residual sludge.

4. A process according to claim 1, in which said aromatic constituents are condensed as an aqueous distillate and the distillate is fractionated.

5. A process according to claim 1, in which said extract is concentrated before being combined with the condensed aromatics.

6. A process according to claim 1, in which the aqueous extract is dried to a solid.

7. A process for preparing a water-soluble chocolate extract, which comprises the steps of steam-stripping aromatic constituents from a mixture of about 8 parts by weight of the cocoa liquor of ground roasted cocoa beans and about 92 parts by weight of water, condensing said aromatic constituents, heating the stripped mixture to a temperature of 107 to 132° C. for a period of from 25 to 35 minutes to extract water-soluble constituents from the cocoa liquor, separating the heated mixture by centrifugation into a first residual sludge and a first aqueous phase containing said water-soluble constituents, separating said first aqueous phase by centrifugation into an aqueous extract, cocoa butter and a second residual sludge, heating said first and second residual sludges together with water to extract water-soluble constituents from the residual sludges, separating by centrifugation the mixture so formed into a third residual sludge and a second aqueous phase containing water-soluble constituents, separating said second aqueous phase by centrifugation into an aqueous extract, cocoa butter and a residual sludge, combining the aqueous extracts from said first and second aqueous phases into an aqueous mixture, concentrating said aqueous mixture and combining the condensed aromatic constituents with said concentrated aqueous mixture.

References Cited
UNITED STATES PATENTS

| | | | |
|---|---|---|---|
| 2,835,585 | 5/1958 | Rusoff | 99—23 |
| 2,853,387 | 9/1958 | Nutting | 99—71 |
| 2,512,663 | 6/1950 | Masurovsky | 99—23 |

LIONEL M. SHAPIRO, Primary Examiner

D. M. NAFF, Assistant Examiner

U.S. Cl. X.R.

99—22